US009319833B1

(12) United States Patent
Greenspan et al.

(10) Patent No.: US 9,319,833 B1
(45) Date of Patent: Apr. 19, 2016

(54) METHODS PROVIDING CONFIGURATION MANAGEMENT FOR MOBILE DEVICES BASED ON LOCATION

(71) Applicant: CA, Inc., Islandia, NY (US)

(72) Inventors: Steven L. Greenspan, Scotch Plains, NJ (US); Debra J. Danielson, Skillman, NJ (US)

(73) Assignee: CA, Inc., New York, NY (US)

( * ) Notice: Subject to any disclaimer, the term of this patent is extended or adjusted under 35 U.S.C. 154(b) by 206 days.

(21) Appl. No.: 14/027,903

(22) Filed: Sep. 16, 2013

(51) Int. Cl.
*H04W 24/00* (2009.01)
*H04W 4/02* (2009.01)

(52) U.S. Cl.
CPC ....................................... *H04W 4/02* (2013.01)

(58) Field of Classification Search
CPC ........ H04W 4/02; H04W 48/16; H04W 88/06
USPC ................................ 455/456.4, 412.1, 414.2
See application file for complete search history.

(56) References Cited

U.S. PATENT DOCUMENTS

| 6,421,544 | B1 | 7/2002 | Sawada |
| 6,453,182 | B1 | 9/2002 | Sprigg et al. |
| 7,991,406 | B2 * | 8/2011 | Korkalo .................. H04L 29/06 455/412.1 |
| 8,078,165 | B2 * | 12/2011 | Mate et al. .................. 455/432.1 |
| 8,554,244 | B2 * | 10/2013 | I'Anson et al. ............. 455/456.1 |
| 8,565,715 | B2 * | 10/2013 | Hampel et al. ............. 455/404.2 |
| 8,880,047 | B2 * | 11/2014 | Konicek ............ H04M 1/72513 455/414.1 |
| 2002/0090931 | A1 | 7/2002 | Papineau et al. |
| 2002/0098861 | A1 | 7/2002 | Doney et al. |
| 2003/0008662 | A1 | 1/2003 | Stern et al. |

(Continued)

FOREIGN PATENT DOCUMENTS

WO        WO 01/45064        6/2001

OTHER PUBLICATIONS

Jim Geier; Tutorials 802.11b "Physical Layer Revealed", www.80211-planet.com/tutorials/article.php/2107261 Retrieved from Internet Mar. 21, 2003.
Lough et al. "A Short Tutorial on Wireless LANs and IEEE 802.11", The Bradley Department of Electrical and Computer Engineering, www.computer.org/students/looking/summer97/ieee802.htm Retrieved from Internet Mar. 21, 2003.
"how it works", Bluetooth: The Official Bluetooth Website; www.bluetooth.com/tech/works.asp Retrieved from Internet May 12, 2003.

(Continued)

*Primary Examiner* — Amancio Gonzalez
(74) *Attorney, Agent, or Firm* — Myers Bigel & Sibley, P.A.

(57) ABSTRACT

A method of operating a wireless terminal communicating with a radio access network over a radio interface may include saving information in memory at the wireless terminal identifying locations associated with a wireless terminal location configuration. A configuration message may be received from a configuration management system over the radio interface at the wireless terminal, with the configuration message including information identifying a new location associated with the wireless terminal location configuration. Responsive to receiving the configuration message, the information identifying the new location associated with the wireless terminal location configuration may be saved in the memory at the wireless terminal thereby adding the new location to the locations associated with the wireless terminal location configuration. A location of the wireless terminal may be monitored based on electronic positioning, and responsive to a monitored location of the wireless terminal being proximate to one of the locations associated with the wireless terminal location configuration in the memory at the wireless terminal, the wireless terminal location configuration may be initiated for the wireless terminal.

18 Claims, 7 Drawing Sheets

(56) References Cited

U.S. PATENT DOCUMENTS

2003/0060198 A1 3/2003 Li
2003/0100352 A1 5/2003 Moles
2003/0133573 A1 7/2003 Himmel et al.
2003/0134627 A1 7/2003 Himmel et al.
2003/0207683 A1 11/2003 Lempio et al.
2004/0147255 A1 7/2004 Lee
2004/0204175 A1 10/2004 Karaoguz et al.
2004/0228460 A1 11/2004 Keramane
2014/0331272 A1* 11/2014 Gupta et al. ............... 726/1

OTHER PUBLICATIONS

The specification; Bluetooth: The Official Bluetooth Website; www.bluetooth.com/dev/specifications.asp Retrieved from Internet May 12, 2003.

"Tasker—Android Apps on Google Play", https://play.google.com/store/apps/details?id=net.dinglisch.android.taskerm&hl=en Retrieved from Internet Aug. 19, 2013.

"Tasker Automation for Android", http://tasker.dinglisch.net Retrieved from Internet Aug. 20, 2013.

* cited by examiner

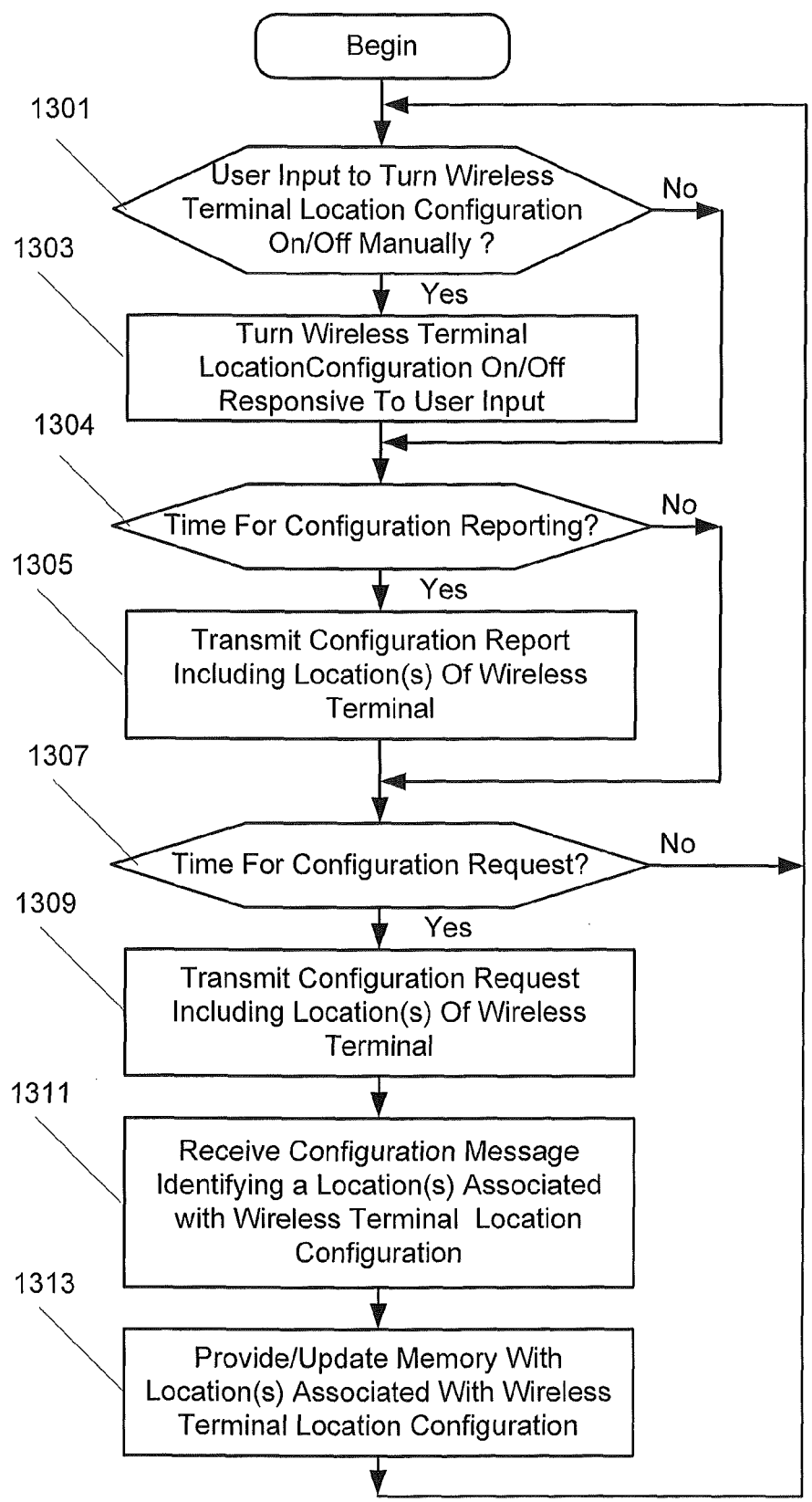

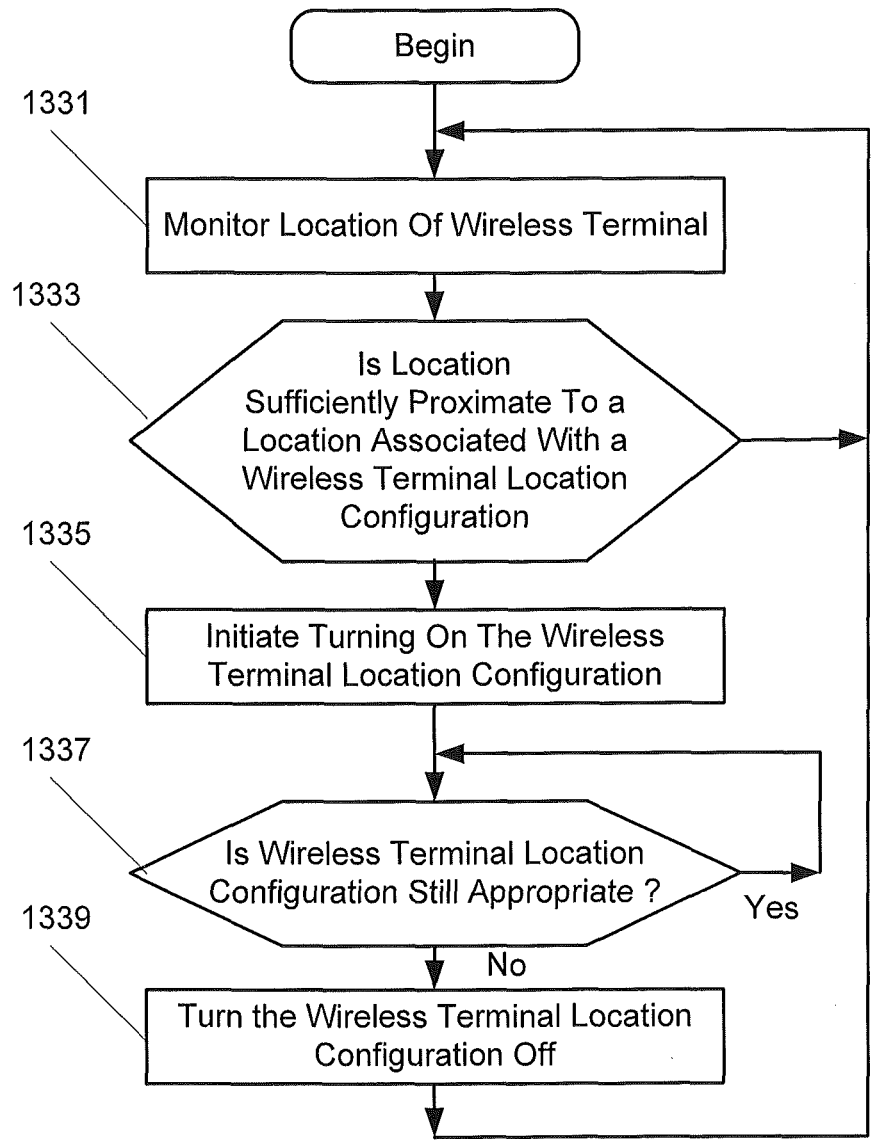

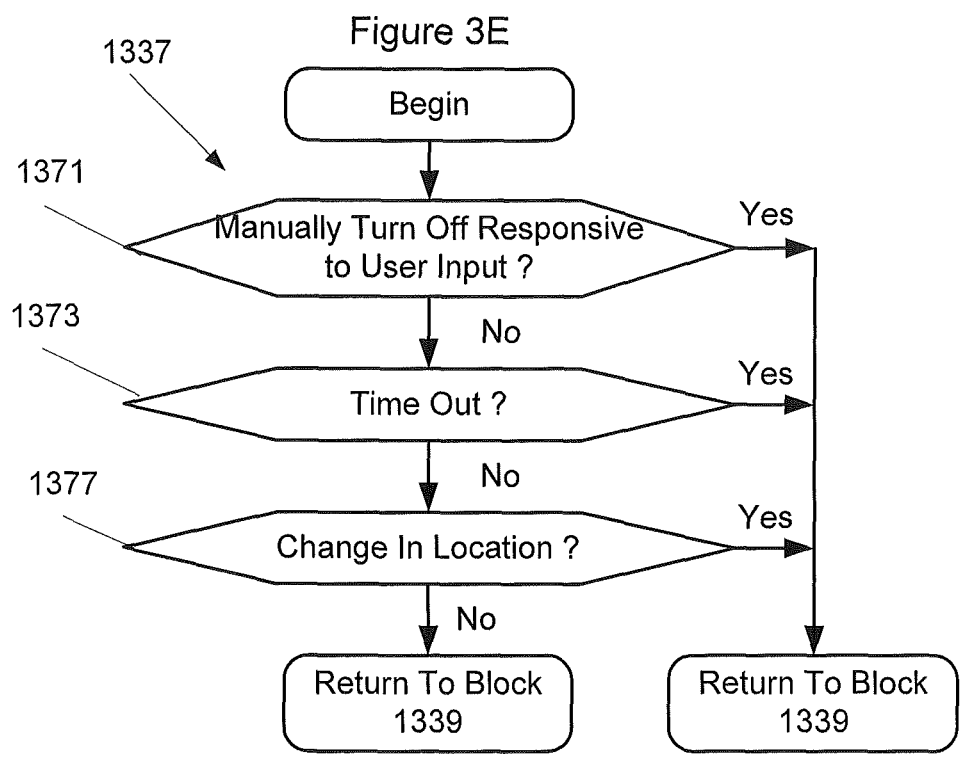

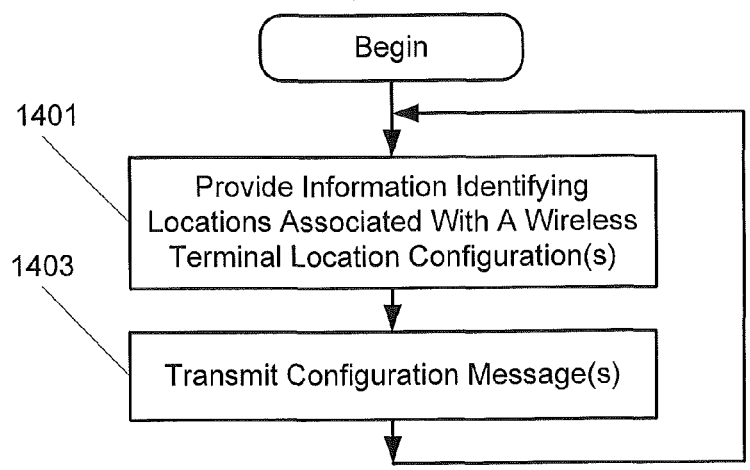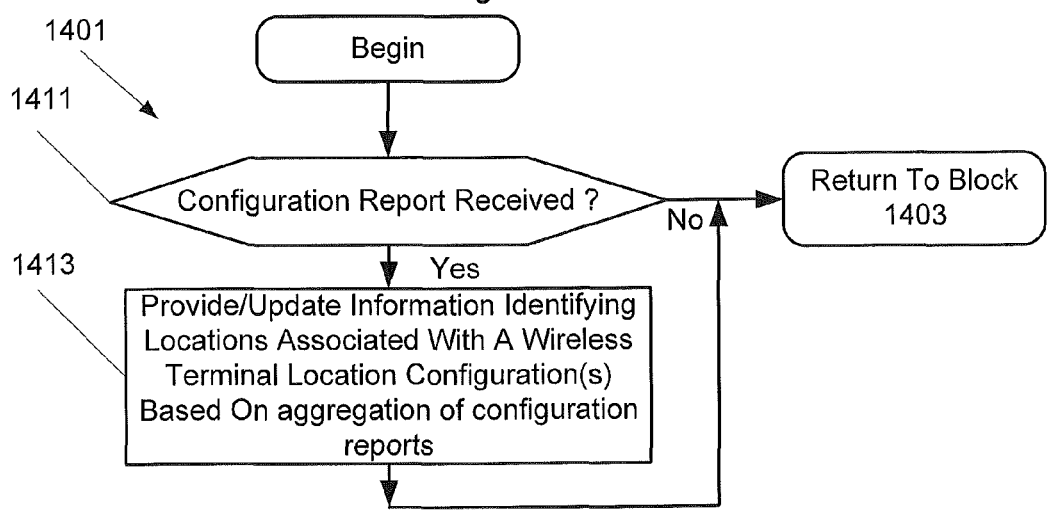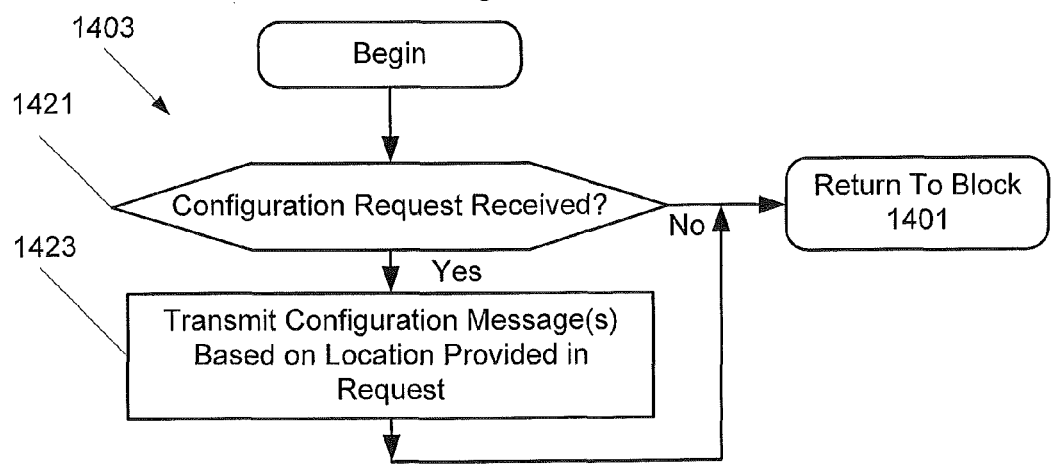

METHODS PROVIDING CONFIGURATION MANAGEMENT FOR MOBILE DEVICES BASED ON LOCATION

BACKGROUND

The present disclosure relates to mobile communications devices, and more particularly, to configuration management for mobile communications devices.

Many functionalities may be provided by mobile communications devices (also referred to as wireless terminals, radiotelephones, smartphones, etc.). A mobile communications device, for example, may combine a plurality of functionalities such as a radiotelephone, an e-mail transmitter/receiver, text message (e.g., Short Message Service or SMS) transmitter/receiver, an internet browser, a digital camera, a digital audio recorder, a digital video recorder, an address book, a calculator, a calendar, a personal digital assistant (PDA), a digital game, an audio player (such as an MP3 player), a digital video player, a pager, a word processor, a spreadsheet, a digital data transmitter, and/or a digital image viewer.

With multiple functionalities provided on a single device, however, if the device must be turned off in environments where one or a subset of the functionalities is prohibited, use of other non-prohibited functionalities may also be lost when the device is turned off. Stated in other words, all use of the device may be lost in environments where only one or a subset of the functionalities is prohibited if the device is turned off. If radio communications are prohibited for safety reasons (such as on an airplane or in a hospital) or if audio notifications (e.g., a ringtone) are prohibited for reasons of courtesy (e.g., in a library, theater, museum, etc.), for example, turning the mobile communications device off may result in loss of use of other allowed functionalities of the mobile communications device as well.

More particularly, functionalities using radio/wireless transmissions (e.g., radiotelephone communications, internet browsing, e-mail communications, text message communications, etc.) may be prohibited in environments where radio transmissions may interfere with operation of critical electronic devices, such as in a hospital or on an airplane. Certain functionalities, such as radiotelephone communications, audio alerts, etc., may also be prohibited where silence is desired (such as in a theater, a library, a museum, etc.). In addition, functionalities including data transmission and/or recording may be prohibited for security reasons (such as in a military area, an industrial area, an embassy, etc.) or for commercial reasons (such as at a museum, a sporting event, a concert, or a theatrical performance where unauthorized image, video, and/or audio reproductions are prohibited).

To address some of these issues, a mobile communications device may provide different configurations to facilitate limited use of the device where/when some functionalities may be prohibited and/or undesired but other functionalities may be permissible. A mobile communications device, for example, may provide an "airplane mode" configuration (also referred to as a non-transmission mode configuration) so that all radio/wireless communications functionalities (e.g., radiotelephone communications, e-mail communications, text message communications, internet browsing, etc.) are suppressed/disabled while allowing use of other functionalities that do not use radio communications (e.g., audio player, video player, games, calculator, calendar function, etc.). In addition or in alternatives, a mobile communications device may provide a "vibrate mode" (or "silent mode") configuration so that audible alerts (e.g., ringtones) are suppressed, with silent alerts being provided using vibration instead.

Typically, the configurations (e.g., "airplane mode" configuration, "vibrate mode" configuration) are turned on/off manually by the user. As a user of a mobile communications device changes locations, however, a desired configuration may change, but the user may not know or remember to turn on/off a configuration as needed.

Notwithstanding known methods/systems, there continues to exist a need to provide improved methods of configuring mobile communications devices.

BRIEF SUMMARY

One aspect of the present disclosure is directed to methods of operating a wireless terminal communicating with a radio access network over a radio interface. Information may be saved in memory at the wireless terminal identifying locations associated with a wireless terminal location configuration. A configuration message may be received from a configuration management system over the radio interface at the wireless terminal, with the configuration message including information identifying a new location associated with the wireless terminal location configuration. Responsive to receiving the configuration message, the information identifying the new location associated with the wireless terminal location configuration may be saved in the memory at the wireless terminal thereby adding the new location to the locations associated with the wireless terminal location configuration. A location of the wireless terminal may be monitored based on electronic positioning, and responsive to a monitored location of the wireless terminal being proximate to one of the locations associated with the wireless terminal location configuration in the memory at the wireless terminal, the wireless terminal location configuration may be initiated for the wireless terminal.

Another related aspect of the present disclosure is directed to a wireless terminal including a processor, and memory coupled to the processor and including computer readable program code that when executed by the processor causes the processor to perform the following operations. Information may be saved in the memory identifying locations associated with a wireless terminal location configuration. A configuration message may be received from a configuration management system over a radio interface at the wireless terminal, with the configuration message including information identifying a new location associated with the wireless terminal location configuration. The information identifying the new location associated with the wireless terminal location configuration may be saved in the memory responsive to receiving the configuration message, thereby adding the new location to the locations associated with the wireless terminal location configuration. A location of the wireless terminal may be monitored based on electronic positioning, and the wireless terminal location configuration may be initiated for the wireless terminal responsive to a monitored location of the wireless terminal being proximate to one of the locations associated with the wireless terminal location configuration in the memory.

Still another related aspect of the present disclosure is directed to a method of managing wireless terminal configurations from a configuration management system. Information is provided identifying locations associated with a wireless terminal location configuration. A configuration message is transmitted from the configuration management system through a radio access network to a wireless terminal, with the configuration message identifying a location associated with the wireless terminal location configuration, and with the location being selected from the information identifying the locations associated with the wireless terminal location configuration.

Yet another related aspect of the present disclosure is directed to a configuration management system including a processor, and memory coupled to the processor including computer readable program code that when executed by the processor causes the processor to perform the following operations. Information is provided identifying locations associated with a wireless terminal location configuration. A configuration message is transmitted from the configuration management system through a radio access network to a wireless terminal, with the configuration message identifying a location associated with the wireless terminal location configuration, and with the location being selected from the information identifying the locations associated with the wireless terminal location configuration.

BRIEF DESCRIPTION OF THE DRAWINGS

Aspects of the present disclosure are illustrated by way of example and are not limited by the accompanying figures, in which like references indicate like elements.

FIGS. 3A, 3B, 3C, 3D, and 3E are block diagrams illustrating operations of wireless terminals of FIG. 2A according to some embodiments of inventive concepts; and FIGS. 4A, 4B, and 4C are flow charts illustrating operations of configuration management systems of FIG. 2B according to some embodiments of inventive concepts.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

Mobile communications devices (such as smart phones) may provide many functionalities including telephone communications, internet access, text messaging, gaming, play back of digitally recorded video/audio, digital audio/video recording, still image photography/recording, etc. In some environments, one or more of these functionalities may be prohibited or discouraged. In a theater, for example, the device should be muted (e.g., muting ringtones and other audio output). In an airplane or hospital, wireless/radio transmissions may be prohibited. Conventionally, the user manually mutes the phone in a theater (referred to as silent mode), or the user manually turns off wireless connectivity in an airplane or hospital (referred to as non-transmission mode). Some users, however, may forget to mute the phone or to turn off wireless connectivity.

Figure 1:
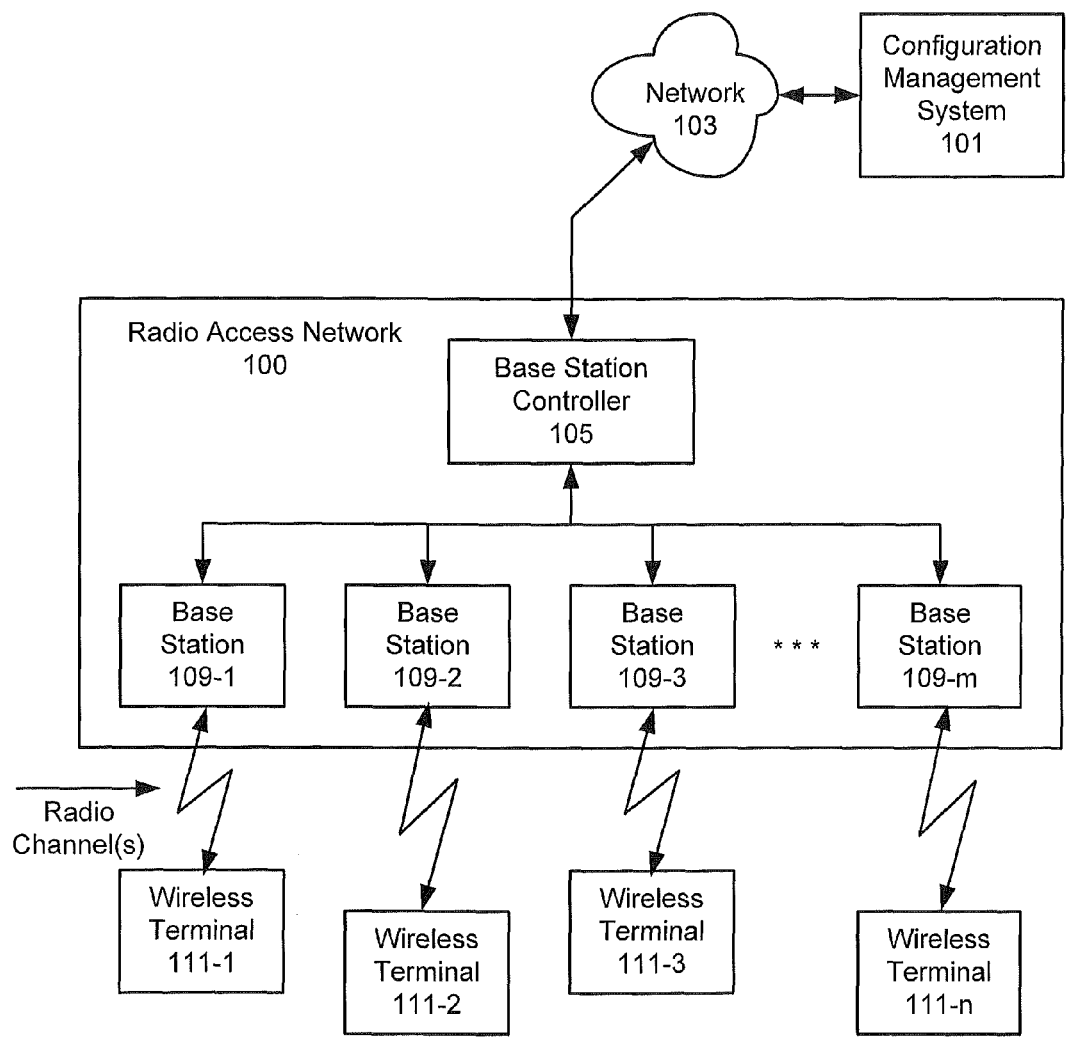
FIG. 1 is a schematic diagram illustrating a communications system including a radio access network (RAN), a configuration management system, and a plurality of wireless terminals according to some embodiments of inventive concepts.

According to some embodiments, a configuration management system 101 may be coupled to a radio access network 100 through a network 103, such as the Internet. The radio access network 100 may include a plurality of base stations 109-1 to 109-*m* each providing radio communications service over a respective cell area/areas. As shown in FIG. 1, a base station controller 105 (e.g., including one or more radio network controllers) may coordinate operations of the base stations 109, provide communications with other radio access networks, provide communications with public switched telephone networks, provide communications with network 103, etc.

Each base station 109 may provide a radio communications interface with a plurality of wireless terminals 111-1 to 111-*n* in a cell area of the base station. While one wireless terminal 111 is shown in communication with each base station 109 by way of example, each base station 109 may support communications with any number of wireless terminals within its cell area.

As shown, configuration management system 101 may be coupled to radio access network 100 through network 103 so that configuration management system 101 is independent of radio access network 100. Accordingly, a single communications management system 101 may provide service through any number of radio access networks. According to some other embodiments, configuration management system 101 and/or functionalities thereof may be implemented in radio access network 100 so that configuration management system 101 is managed by an operator of radio access network 100.

Figure 2A:
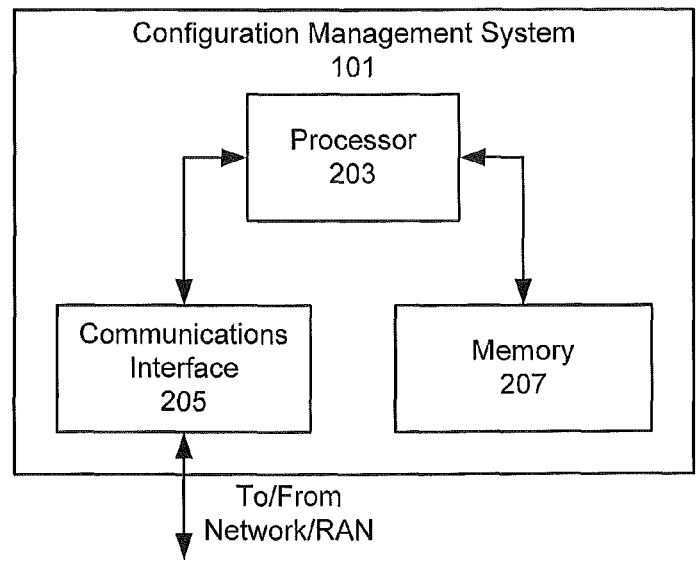
FIG. 2A is a block diagram illustrating configuration management systems of FIG. 1 according to some embodiments of inventive concepts.

FIG. 2A is a block diagram illustrating elements of configuration management system 101 according to some embodiments. As shown, configuration management system 203 may include processor 203, communications interface 205, and memory 207. Memory 207 may include computer readable program code that is executed by processor 203 to perform operations discussed in greater detail below. In addition, memory 207 may store information identifying locations associated with a wireless terminal location configuration(s). While memory 207 is shown internal to configuration management system 101, elements of memory 207 may be provided external to configuration management system 101. For example, an external database may be used to store information identifying locations associated with a wireless terminal location configuration(s).

In embodiments shown in FIGS. 1 and 2A, communications interface 205 may be a network interface providing communications through network 103 to radio access network 100 and other radio access networks. If configuration management system 101 is implemented as an element of radio access network 100, however, communications interface 205 may provide communications directly with one or more elements of radio access network (e.g., with base stations, base station controller, etc.).

Figure 2B:
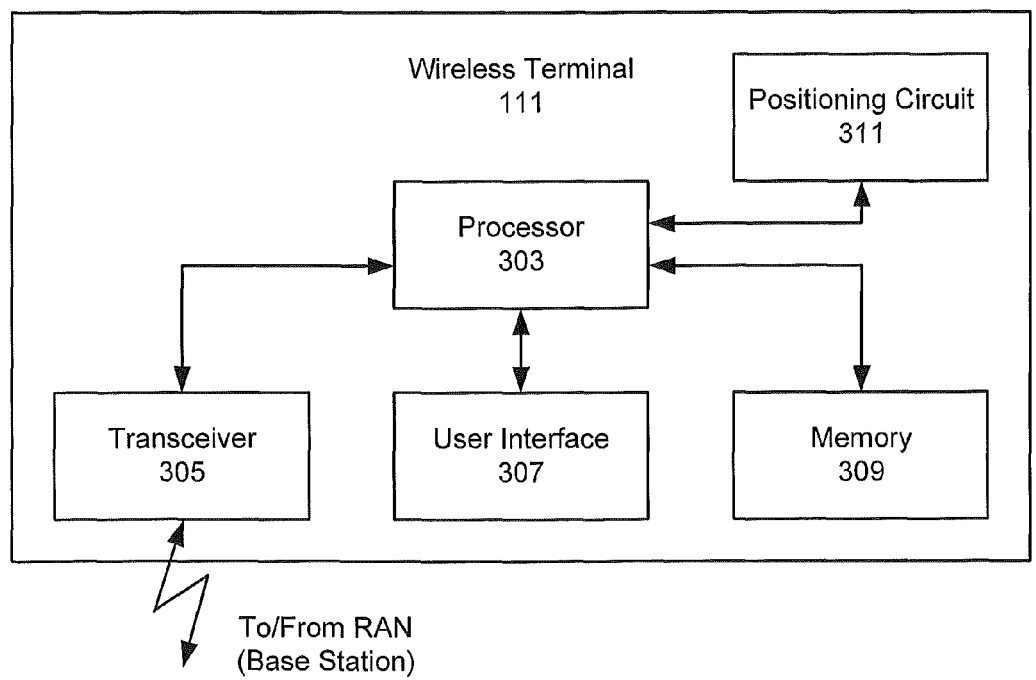
FIG. 2B is a block diagram illustrating wireless terminals of FIG. 1 according to some embodiments of inventive concepts.

FIG. 2B is a block diagram illustrating a wireless terminal 111 according to some embodiments. As shown, wireless terminal 111 may include processor 303, transceiver 305, user interface 307, memory 309, and positioning circuit 311 (e.g., GPS circuit). Memory 309 may include computer readable program code that is executed by processor 303 to perform operations discussed in greater detail below. In addition, memory 309 may store information identifying locations associated with a wireless terminal location configuration(s).

Transceiver 305 may include radio receiver and transmitter circuits providing wireless radio communications between wireless terminal 111 and a base station 101 over a radio channel. User interface 307 may include elements used to accept user input and to provide visual/audio output, such as a speaker, microphone, keypad, display, touch sensitive screen, etc. Positioning circuit 311 may be configured to determine a location of wireless terminal 111. For example, position circuit 311 may be a Global Positioning System (GPS) circuit configured to determine a position of wireless terminal 111 using GPS signals transmitted by GPS satellites. According to some other embodiments, positioning circuit 311 may determine a position of wireless terminal 111 using other signals, such as LORAN (LOngRAngeNavigation) signals, signals transmitted by base stations 111, etc. According to still other embodiments, radio access network 100 may determine a location of wireless terminal 111 using signals received from wireless terminal 111 at multiple base stations 109, and information identifying the location of wireless terminal 111 may be transmitted from radio access network 100 to wireless terminal 111 so that a separate positioning circuit 311 is not required at wireless terminal 111.

Centralized configuration management system 101 for wireless terminals 111 may thus collect configuration information (e.g., for silent mode configuration, for non-transmission mode configuration, etc.) and associated location information (e.g., GPS coordinates) from wireless terminals, and configuration management system 101 may use the collected information to generate wireless terminal location configurations associated with different locations. The wireless terminal location configurations and respective associated locations may then be transmitted to wireless terminals allowing these wireless terminals to automatically (i.e., without user intervention) assume a location configuration in an associated location.

According to some embodiments, wireless terminals 111 may generate a silent mode configuration (also referred to as a mute mode or vibration mode configuration) report each time that wireless terminal is manually switched to the silent mode configuration, and the silent mode configuration report indicates where (e.g., based on GPS coordinates) the mobile device is located when the mobile device is manually switched to the silent mode configuration. Moreover, wireless terminal 111 may transmit the resulting silent mode configuration reports to centralized configuration management system 101. Each silent mode configuration report may be transmitted individually responsive to each manual silent mode configuration occurrence, or a plurality of silent mode configuration reports may be saved at the mobile device before transmitting the plurality of silent mode configuration reports (e.g., at a specified time/interval, when network traffic conditions are favorable, responsive to a request from the centralized management system 101, etc.). The centralized configuration management system 101 may thus receive these silent mode configuration reports from many wireless terminals, and the centralized configuration management system 101 may build a map of silent mode configuration locations based on an aggregation of data received from many mobile devices.

In the example of silent mode configuration reporting and mapping, large numbers of people with wireless terminals entering a theater will manually switch their wireless terminals 111 to the silent mode configuration (e.g., to mute ringtones) resulting in large numbers of mute configuration reports to the centralized configuration management system 101 identifying the location (e.g., using GPS coordinates) of the theater as a location for silent mode configuration. Responsive to receiving a threshold number of silent mode configuration reports identifying a particular location (e.g., a location of a theater) as a muting location, the centralized configuration management system 101 may add this location to its map/database of silent mode configuration locations, and the centralized configuration management system 101 may transmit a wireless terminal location configuration message to mobile stations to automatically turn on the silent mode configuration when sufficiently proximate to this location. According to some embodiments, a group of reported locations that are sufficiently proximate (e.g., within 10 meters, 50 meters, etc.) may be considered as a same location for purposes of determining a threshold number of reports from a same location. Once a location is identified based on a threshold number of such reports, the location may be identified as a central/average of the reported locations, as a range of locations, etc.

Similar reporting, mapping, and location configuration operations may be applied to other mobile device configurations, such as a non-transmission mode configuration. Mobile devices in a hospital (or other medical facility), for example, may be configured to block transmissions (e.g., referred to as an airplane mode), and these locations may be mapped by the centralized configuration management system 101. Such mappings may also apply to airplanes during boarding and/or take-off because the airplanes are in a confined area of a runway/tarmac/jetway when the non-transmission mode configuration is initiated. The mappings may also apply other attributes (such as movement/speed) combined with location. For example, locations associated with a wireless terminal location configuration(s) may include roadways and a wireless terminal location configuration may be initiated on roadways at a certain speed. For example, full use of the wireless terminal may be allowed when the wireless terminal is motionless (or moving below a threshold speed) on a roadway, but a wireless terminal location configuration (e.g., restricting service) may be automatically initiated and/or turned on when the wireless terminal is moving (e.g., above a threshold speed) on the roadway.

In addition, once a location configuration has been automatically turned on based on location, the location configuration may be maintained by the wireless terminal until the user manually turns the location configuration off, until a timer runs out, until the wireless terminal has moved a threshold distance from the mapped location, until the wireless terminal stops moving or slows below a threshold speed, until the wireless terminal starts moving or speeds above a threshold speed, until an altitude of the wireless terminal exceeds a threshold altitude, until an altitude of the wireless terminal is less than a threshold altitude, etc.

Centralized configuration management system 101 may thus receive configuration reports from many wireless terminals (with each report identifying a location and a configuration change), and the configuration management system 101 may build one or more configuration maps using an aggregation of such configuration reports. The system may then transmit a location configuration setting associated with a location to a wireless terminal so that that wireless terminal may automatically adopt/initiate the location configuration at the associated location.

FIG. 3A is a flow chart illustrating wireless terminal 111 operations supporting location configuration mapping. At block 1301, wireless terminal processor 303 may monitor user interface 307 for user input to manually turn on a wireless terminal location configuration. User interface 307, for example, may provide a switch, a button/key, and/or a graphical interface icon on a touch screen to manually turn on a wireless terminal location configuration. By way of example, the silent mode configuration (also referred to as a vibration mode configuration) will be discussed as a wireless terminal location configuration. According to other embodiments, the non-transmission mode configuration (also referred to as a airplane mode configuration) may be a wireless terminal location configuration. According to still other embodiments, a non-recording mode configuration (blocking audio/video, still image photography/recording, etc.) may be a wireless terminal location configuration. According to still other embodiments, wireless terminal 111 may support multiple different wireless terminal location configurations (e.g., silent mode configuration, non-transmission mode configuration, turning on/off voice activation, etc.) with different associated locations.

Responsive to the user terminal processor 303 detecting user input to manually turn on a wireless terminal location configuration (e.g., the silent mode configuration), processor 303 may turn on the wireless terminal location configuration (e.g., muting ringtones and instead using a vibration alerts/notifications) at block 1303. Once the wireless terminal location configuration has been turned on manually at block 1303, processor 303 may maintain the wireless terminal location configuration on until user input through user interface 307 is detected at block 1301 to turn the wireless terminal location configuration off. Responsive to detecting user input to manually turn off the wireless terminal location configuration (e.g., to turn off the silent mode configuration), processor 303 may turn off the wireless terminal location configuration (e.g., providing ringtone alerts/notification and turning off vibration alerts) at block 1303.

According to some embodiments, wireless terminal 111 uses configuration reports to report information identifying locations where the wireless terminal location configuration is turned on to configuration management system 101. At block 1304, processor 303 may determine when configuration reporting is appropriate, and responsive to determining that a configuration report should be sent, processor 303 transmits a configuration report through radio access network 100 to configuration management system 101 at block 1305. According to some embodiments, wireless terminal processor 303 may transmit a configuration report each time the wireless terminal location configuration is turned on manually. According to some other embodiments, wireless terminal processor 303 may wait for favorable traffic conditions (e.g., relatively low traffic conditions) to transmit configuration reports. According to still other embodiments, wireless terminal processor 303 may transmit a single configuration report identifying a plurality of locations where the wireless terminal location configuration was turned on manually thereby reducing traffic required to support configuration reporting. A configuration report may thus identify a location/locations where the wireless terminal location configuration is manually turned on for wireless terminal 111, and this location/locations may be determined by processor 303, for example, using positioning circuit 311 (e.g., using GPS, LORAN, triangulation from base station signals, etc.).

As discussed in greater detail below, aggregations of information provided in configuration reports from many different wireless terminals may be used by configuration management system 101 to determine locations that should be associated with each wireless terminal location configuration. Many users of wireless terminals entering a theater, for example, will manually turn on the silent mode configuration resulting in a large number of configuration reports identifying the location of the theater (or identifying a proximate cluster of locations of the theater) as a place where the silent mode configuration is appropriate/desired/required. Responsive to receiving a threshold number of such configuration reports (e.g., over a defined period of time) identifying locations within a sufficiently small area for a wireless terminal location configuration, configuration management system 101 may add that location to the locations associated with the wireless terminal location configuration. Configuration reports identifying locations that do not meet the threshold, however, may ultimately be disregarded so that every location identified in a configuration report is not associated with the wireless terminal location configuration. Moreover, time constraints may be applied to a wireless terminal location configuration so that the wireless terminal location configuration is only initiated at a location during a certain window/windows of time. In a theater, for example, a silent mode location configuration may only be initiated during show times.

Over time, configuration management system 101 may thus add locations to be associated with the wireless terminal location configuration. Moreover, different locations for the wireless terminal location configuration may be relevant based on a current location of wireless terminal 111. Stated in other words, one group of locations for the wireless terminal location configuration may be provided for wireless terminal 111 when wireless terminal 111 is located in one region (e.g., city, county, state, etc.), and another group of locations for the wireless terminal configuration may be provided for wireless terminal 111 when the wireless terminal is located in another region (e.g., another city, county, state, etc.). As discussed in greater detail below, configuration management system may thus transmit configuration messages providing currently relevant locations for the wireless terminal location configuration to wireless terminal 111.

According to some embodiments, wireless terminal 111 may determine when to transmit a configuration request to configuration management system (101) at block 1307. For example, wireless terminal processor 303 may transmit configuration requests (through transceiver 305 and radio access network 100 to configuration management system 101) periodically (e.g., after passage of a defined period such as an hour, a day, a week, etc.) and/or when wireless terminal 111 is turned on. In addition or in an alternative, wireless terminal processor 303 may transmit configuration requests responsive to detecting movement from one region (e.g., city, county, state, etc.) to another region (e.g., city, county, state, etc.).

Responsive to determining that a configuration request should be transmitted at block 1307, processor 303 may transmit a configuration request through transceiver 305 and radio access network 100 to configuration management system 101 at block 1309. More particularly, the configuration request message includes information identifying a current location of the wireless terminal, thereby allowing configuration management system 101 to determine appropriate locations to be associated with the wireless terminal location configuration for wireless terminal 111 based on its current location. Processor 303, for example, may use positioning circuit 311 to determine a current location of wireless terminal 111 (e.g., using GPS, LORAN, triangulation from base station signals, etc.).

Responsive to the configuration request, configuration management system may thus transmit a configuration message for the wireless terminal location configuration to wireless terminal 111. At block 1311, processor 303 may receive the configuration message through radio access network 100 and transceiver 305, and the configuration message may include information identifying one or more locations (e.g., including a new location) associated with the wireless terminal location configuration. At block 1313, processor 303 may provide information in memory 309 identifying the one or more locations from the configuration message associated with the wireless terminal location configuration. According to some embodiments, a configuration message may provide information for all locations to be associated with the wireless terminal location configuration for wireless terminal 111 (replacing information for all locations identified in earlier configuration messages) sent to wireless terminal 111. According to some other embodiments, each configuration message may provide information for additional locations to be used together with information for locations received in previous configuration messages.

Wireless terminal memory 309 may thus include information identifying a plurality of locations associated with the wireless terminal location configuration, and as discussed below with respect to FIG. 3B, processor 303 may use this information to determine when to automatically turn on the wireless terminal location configuration based on a current location of wireless terminal 111. At block 1331, processor 303 may monitor a location of wireless terminal 111 based on electronic positioning information, for example, provided by positioning circuit 311 (e.g., using GPS, LORAN, triangulation, etc.). Moreover, locations may be monitored in three dimensions (e.g., including altitude). Altitude may thus be used as a criteria to initiate, turn on, and/or turn off a wireless terminal location configuration.

Responsive to a monitored location of the wireless terminal being sufficiently proximate to one of the locations associated with the wireless terminal location configuration in memory 309 at block 1333, processor 303 may automatically initiate turning on the wireless terminal location configuration at block 1335. For example, processor 303 may automatically initiate turning on the wireless terminal location configuration responsive to the wireless terminal being located within a threshold distance from one of the locations associated with the location configuration. According to some embodiments, processor 303 may automatically initiate turning on the wireless terminal location configuration by automatically turning on the wireless terminal location configuration without notifying the user. According to other embodiments discussed below with respect to FIGS. 3C and 3D notification may be provided with a request for opt-in or opt-out input from the user.

Figure 3C:
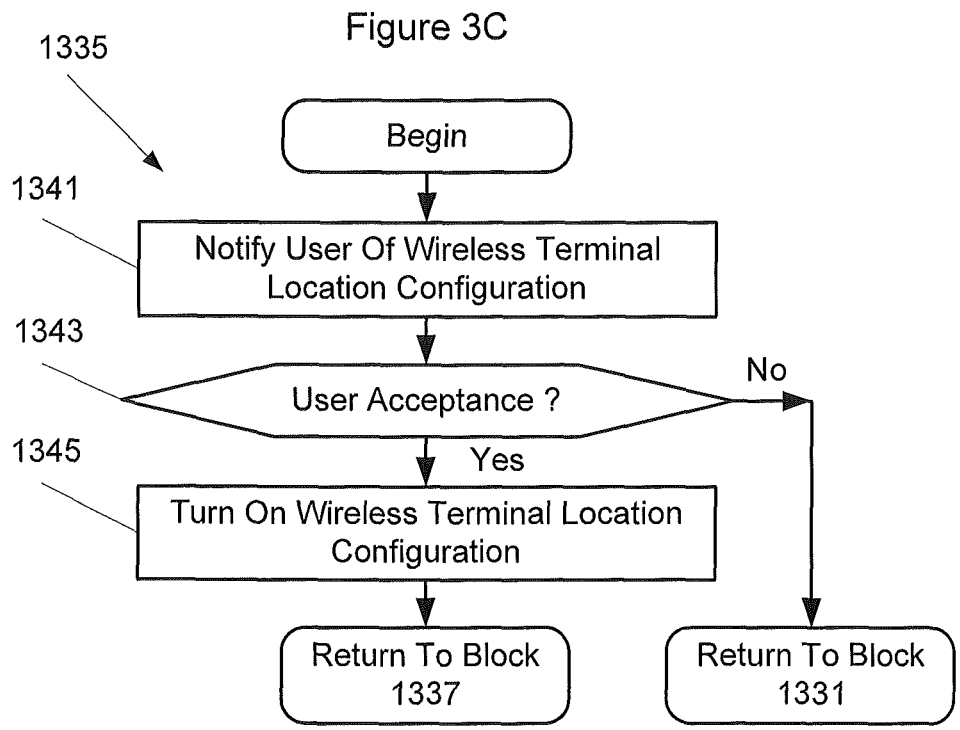

In FIG. 3C, for example, processor 303 may notify a user of wireless terminal 111 that the wireless terminal location configuration is recommended at block 341. The notification may be provided, for example, on a display of user interface 307 and/or audibly through a speaker of user interface 307. A notification on a touch sensitive display, for example, may provide options to accept or reject the wireless terminal location configuration. Responsive to user input accepting the wireless terminal configuration through user interface at block 1343, processor 303 may turn on the wireless terminal location configuration at block 1345 and return to block 1337 of FIG. 3B. Responsive to user input rejecting the wireless terminal configuration through user interface at block 1343, processor 303 may maintain the wireless terminal location configuration off and return to block 1331 of FIG. 3B. In embodiments, of FIG. 3C, initiating turning on the wireless terminal location configuration provides automatic notification but requires user acceptance to actually turn on the wireless terminal default configuration. User failure to respond to the notification of FIG. 3C is treated as user rejection.

According to some embodiments, processor 303 may automatically provide a restricted level of service (as an intermediate level of service between full surface and a level of service provided according to the location configuration) when the initiating the wireless terminal location configuration before receiving user acceptance at block 1343. If the location configuration is a non-transmission mode configuration, for example, the restricted level of service may provide transmission for emergency communications only service (e.g., allowing only 911 emergency calls but blocking all other outgoing and incoming calls), and/or the restricted level of service may mute audio notifications (e.g., ringers, ringtones, etc.) while allowing outgoing and/or incoming calls. Responsive to user input accepting the location configuration at block 1343, processor 303 may turn on the wireless terminal location configuration at block 1345 (e.g., turning on the non-transmission mode configuration). If user input is received rejecting the location configuration (or if no user acceptance/rejection is received) at block 1343, processor 303 may continue providing the restricted level of service until the wireless terminal location configuration is no longer appropriate at block 1337.

Figure 3D:
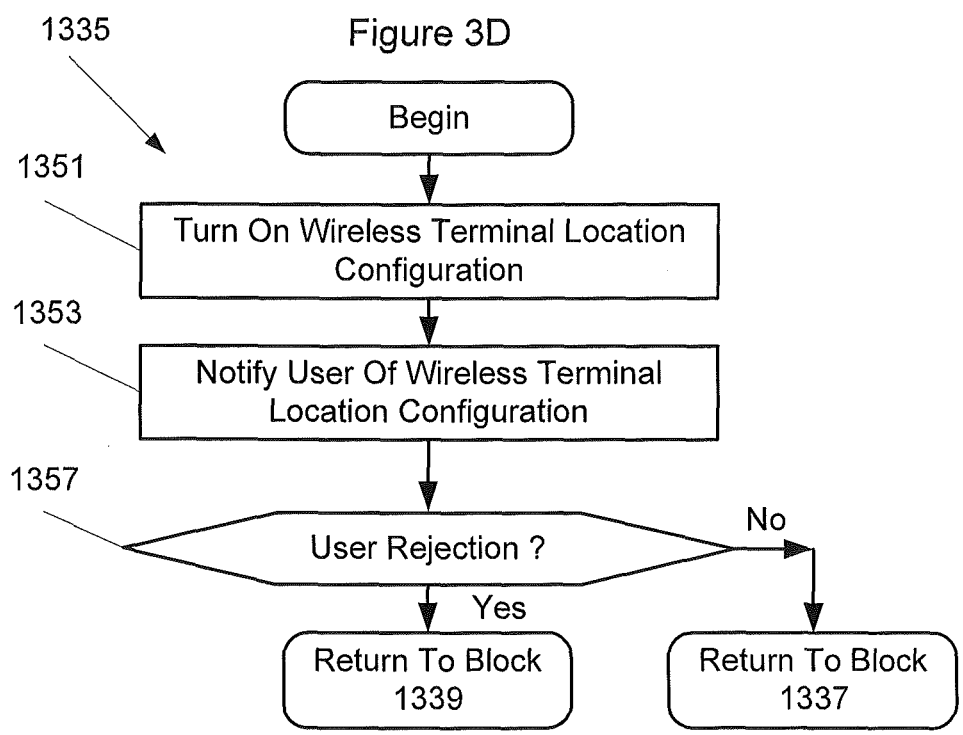

In FIG. 3D, processor 303 may automatically turn on the wireless terminal location configuration at block 1351, and notify a user of the wireless terminal location configuration at block 1353. The notification may be provided, for example, on a display of user interface 307 and/or audibly through a speaker of user interface 307. A notification on a touch sensitive display, for example, may provide options to accept or reject the wireless terminal location configuration. After automatically turning on the wireless terminal location configuration at block 1351 and providing notification at block 1353, processor 303 may turn the wireless terminal location configuration off at block 1339 (of FIG. 3B) responsive to user rejection of the wireless terminal location configuration at block 1357. After automatically turning on the wireless terminal location configuration at block 1351 and providing notification at block 1353, processor 303 may maintain the wireless terminal location configuration on responsive to user acceptance of the wireless terminal location configuration at block 1357 and return to block 1337 of FIG. 3B. User failure to respond to the notification of FIG. 3D is treated as user acceptance.

According to some embodiments, processor 303 may provide a restricted level of service (as an intermediate level of service between full surface and a level of service provided according to the location configuration) if user input is received rejecting the location configuration at block 1357. If the location configuration is a non-transmission mode configuration, for example, the restricted level of service may provide transmission for emergency communications only service (e.g., allowing only 911 emergency calls but blocking all other outgoing and incoming calls), and/or the restricted level of service may mute audio notifications (e.g., ringers, ringtones, etc.) while allowing outgoing and/or incoming calls. If user input is received rejecting the location configuration at block 1357, processor 303 may continue providing the restricted level of service until the wireless terminal location configuration is no longer appropriate at block 1337.

Once the wireless terminal location configuration has been turned on, processor 303 may determine whether the wireless terminal location configuration is still appropriate at block 1337 of FIG. 3B. Once the wireless terminal location configuration is no longer appropriate at block 1337, processor 303 turns the wireless terminal location configuration off at block 1339.

An example of operations to determine whether the wireless terminal location configuration is still appropriate are illustrated in FIG. 3E. By way of example, processor 303 may turn off the wireless terminal location configuration responsive to user input through user interface 307 to manually turn off the wireless terminal location configuration at block 1371, responsive to expiration of a timer at block 1373, and/or responsive to detecting a change in location of wireless terminal 111 away from the location associated with the wireless terminal location configuration at block 1377. More particularly with respect to block 1377, once the wireless terminal location configuration is turned on responsive to a location of wireless terminal 111, processor 303 may continue monitoring a location of wireless terminal 111 (using information from position circuit 311) and turn the wireless terminal location configuration off once the wireless terminal moves a threshold distance away from the location that triggered turning the wireless terminal location configuration on.

Operations of configuration management system 101 with now be discussed with reference to the flow charts of FIGS. 4A, 4B, and 4C. As shown in FIG. 4A, processor 203 may provide information in memory 207 identifying locations associated with a wireless terminal location configuration at block 1401. At block 1403, processor 203 may transmit a configuration message(s) through communications interface 205 and radio access network 100 to wireless terminal 111. More particularly, the configuration message may identify a location(s) associated with the wireless terminal location configuration, and the location(s) is selected from the information identifying the locations associated with the wireless terminal location configuration. As discussed above, each of the locations may be identified using Global Positioning System (GPS) information, LORAN information, triangulation information, etc. associated with the location. Moreover, the wireless terminal location configuration may be a non-transmission mode configuration and/or a silent mode configuration, and/or a non-recording mode configuration.

Operations of block 1401 providing information identifying locations associated with the wireless terminal locations configuration are discussed in greater detail with respect to FIG. 4B. At block 1401, processor 203 may determine if a configuration report has been received from a wireless terminal. Processor 203 may thus receive configuration reports from many wireless terminals through radio access network 100 and communications interface 205, with each configuration report including an identification of a location(s) where the wireless terminal location configuration was turned on for a wireless terminal.

At block 1413, processor 203 may provide/update information identifying locations associated with the wireless terminal location configuration by providing the information based on an aggregation of the configuration reports. Accordingly, a single configuration report may not result in the addition of information for a location to be associated with the wireless terminal location configuration. Instead a plurality of such configuration reports from a same/similar location may be required to add a location for a configuration. For example, processor 203 may be configured to add information for a new location responsive to receiving a threshold number of configuration reports including respective identifications of locations within a defined distance of each other within a defined period of time. A resulting location that is provided for the wireless terminal location configuration may be an average/central location of the corresponding reported locations, a range of locations, etc.

Operations of block 1403 transmitting configuration messages are discussed in greater detail with respect to FIG. 4C. At block 1421, processor 203 may receive a configuration request from the wireless terminal through radio access network 100 and communications interface 205, with the configuration request identifying a location of the wireless terminal 111, and processor may select the location(s) associated with the wireless terminal location configuration for the configuration message based on the location of wireless terminal 111. At block 1423, processor 203 may transmit the configuration message through communication interface 205 and radio access network 100 to wireless terminal 111 with the configuration message identifying the location(s) associated with the wireless terminal location configuration selected based on the location of the wireless terminal.

As discussed above with respect to FIGS. 3A-E and 4A-C, the wireless terminal location configuration may be a silent (vibration) mode configuration, and the configuration reports, the configuration messages, and related locations may all relate to the silent mode configuration. According to other embodiments, the wireless terminal location configuration may be a non-transmission (airplane) mode configuration, and the configuration reports, the configuration messages, and related locations may all relate to the non-transmission mode configuration. According to still other embodiments, wireless terminals and configuration management system may support multiple wireless terminal locations configurations (e.g., silent mode and non-transmission mode configurations) with different groups of locations being identified for each configuration.

With first and second wireless terminal location configurations (e.g., silent mode and non-transmission mode configurations), first information may be provided identifying first locations associated with a first wireless terminal location configuration, and second information may be provided identifying second locations associated with a second wireless terminal location configuration different than the first wireless terminal location configuration. Accordingly, configuration messages and reports may identify both the wireless terminal location configuration and the location(s).

According to embodiments discussed above, wireless terminal location configurations may be turned on/off automatically based on location. Embodiments of inventive concepts are not limited to wireless terminals discussed above, however, but may be extended to any location enabled (e.g., GPS location enabled) device/devices that having configuration alternatives. For example, a change in configuration may be effected when two devices are in proximity, e.g., privacy configuration settings may change for a laptop if the user's smart phone is used to route data through a more secure network as opposed to a public wifi network.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, in entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of operating a wireless terminal communicating with a radio access network over a radio interface, the method comprising:
saving information in memory at the wireless terminal identifying a plurality of locations associated with a wireless terminal location configuration;
receiving a configuration message from a configuration management system over the radio interface at the wireless terminal, wherein the configuration message includes information identifying a new location associated with the wireless terminal location configuration;
responsive to receiving the configuration message, saving the information identifying the new location associated with the wireless terminal location configuration in the memory at the wireless terminal thereby adding the new location to the plurality of locations associated with the wireless terminal location configuration;
monitoring a location of the wireless terminal based on electronic positioning using a processor of the wireless terminal;
responsive to the processor of the wireless terminal determining that a monitored location of the wireless terminal is proximate to one of the plurality of locations associated with the wireless terminal location configuration in the memory at the wireless terminal based on monitoring the location of the wireless terminal using the processor of the wireless terminal, initiating the wireless terminal location configuration for the wireless terminal using the processor;
responsive to user input through a user interface, turning on the wireless terminal location configuration; and
responsive to the user input through the user interface to turn on the wireless terminal location configuration, transmitting a configuration report for the wireless terminal location configuration from the wireless terminal over the radio interface to the configuration management system, wherein the configuration report includes information identifying a current location of the wireless terminal.

2. The method of claim 1 further comprising:
before receiving the configuration message, transmitting a configuration request from the wireless terminal over the radio interface to the configuration management system,
wherein the configuration request message includes information identifying a current location of the wireless terminal.

3. The method of claim 1 wherein initiating the wireless terminal location configuration comprises,
notifying a user of the wireless terminal location configuration through a user interface; and
responsive to user acceptance of the wireless terminal location configuration through the user interface after notifying the user, turning on the wireless terminal location configuration.

4. The method of claim 3 further comprising:
before turning on the wireless terminal location configuration, turning on a restricted level of service for the wireless terminal.

5. The method of claim 1 wherein initiating the wireless terminal location configuration comprises,
automatically turning on the wireless terminal location configuration without user intervention;
after automatically turning on the wireless terminal location configuration, notifying a user of the wireless terminal location configuration; and
after automatically turning on the wireless terminal location configuration, turning the wireless terminal location configuration off responsive to user rejection of the wireless terminal location configuration.

6. The method of claim 5 further comprising:
turning on a restricted level of service for the wireless terminal responsive to user rejection of the wireless terminal location configuration.

7. The method of claim 1 wherein initiating the wireless terminal location configuration comprises automatically turning on the wireless terminal location configuration without user intervention.

8. The method of claim 1 wherein initiating the wireless terminal location configuration comprises turning on the wireless terminal location configuration, the method further comprising:
after turning on the wireless terminal location configuration, turning off the wireless terminal location configuration responsive to user input through the user interface, responsive to expiration of a timer, and/or responsive to detecting a change in location of the wireless terminal away from the location associated with the wireless terminal location configuration.

9. A wireless terminal comprising:
a processor, and
memory coupled to the processor and comprising computer readable program code that when executed by the processor causes the processor to perform operations to,
save information in the memory identifying a plurality of locations associated with a wireless terminal location configuration,
receive a configuration message from a configuration management system over a radio interface at the wireless terminal, wherein the configuration message includes information identifying a new location associated with the wireless terminal location; configuration,
save the information identifying the new location associated with the wireless terminal location configuration in the memory responsive to receiving the configuration message, thereby adding the new location to the plurality of locations associated with the wireless terminal location configuration,
monitor a location of the wireless terminal based on electronic positioning,
initiate the wireless terminal location configuration for the wireless terminal responsive to a monitored location of the wireless terminal being proximate to one of the plurality of locations associated with the wireless terminal location configuration in the memory based on monitoring the location of the wireless terminal,
turn on the wireless terminal location configuration responsive to user input through a user interface, and
transmit a configuration report for the wireless terminal location configuration from the wireless terminal over the radio interface to the configuration management system responsive to the user input through the user interface to turn on the wireless terminal location configuration, wherein the configuration report includes information identifying a current location of the wireless terminal.

10. A method of managing wireless terminal configurations from a configuration management system, the method comprising:

saving information identifying a plurality of locations associated with a wireless terminal location configuration;

transmitting a configuration message from the configuration management system through a radio access network to a wireless terminal, wherein the configuration message identifies a location associated with the wireless terminal location configuration, and wherein the location is selected from the information identifying the plurality of locations associated with the wireless terminal location configuration; and receiving a plurality of configuration reports at the configuration management system from respective wireless terminals, wherein each of the plurality of configuration reports includes a respective identification of a location;

wherein saving the information identifying the plurality of locations associated with the wireless terminal location configuration comprises providing the information identifying one of the plurality of locations based on an aggregation of the plurality of identifications of locations from respective ones of the plurality of configuration reports from the respective wireless terminals.

11. The method of claim 10 wherein each of the plurality of locations is identified by Global Positioning System (GPS) information associated with the location, and wherein the wireless terminal location configuration comprises at least one of a non-transmission mode configuration and/or a silent mode configuration.

12. The method of claim 10 wherein providing the information comprises adding information for a new location responsive to receiving a threshold number of configuration reports from the respective wireless terminals including respective identifications of locations within a defined distance of each other.

13. The method of claim 10 wherein providing the information comprises adding information for a new location responsive to receiving a threshold number of configuration reports including respective identifications of locations within a defined distance of each other within a defined period of time.

14. The method of claim 10 further comprising:
receiving a configuration request from the wireless terminal, wherein the configuration request identifies a current location of the wireless terminal; and
selecting the location associated with the wireless terminal location configuration for the configuration message based on the current location of the wireless terminal;
wherein transmitting the configuration message comprises transmitting the configuration message to the wireless terminal with the configuration message identifying the location associated with the wireless terminal location configuration selected based on the current location of the wireless terminal.

15. The method of claim 10,
wherein providing the information comprises,
providing first information identifying a first plurality of locations associated with a first wireless terminal location configuration and
providing second information identifying a second plurality of locations associated with a second wireless terminal location configuration different than the first wireless terminal location configuration; and
wherein transmitting the configuration message comprises transmitting the configuration message to the wireless terminal with the configuration message identifying one of the first plurality of locations associated with the first wireless terminal location configuration and identifying one of the second plurality of locations associated with the second wireless terminal location configuration.

16. The method of claim 15 wherein the first wireless terminal location configuration comprises a silent mode configuration and the second wireless terminal location configuration comprises a non-transmission mode configuration.

17. A configuration management system comprising:
a processor; and
memory coupled to the processor and comprising computer readable program code that when executed by the processor causes the processor to perform operations to,
provide information identifying a plurality of locations associated with a wireless terminal location configuration,
transmit a configuration message through a radio access network to a wireless terminal, wherein the configuration message identifies a location associated with the wireless terminal location configuration, and wherein the location is selected from the information identifying the plurality of locations associated with the wireless terminal location configuration, and
receive a plurality of configuration reports at the configuration management system from respective wireless terminals, wherein each of the plurality of configuration reports includes a respective identification of a location;
wherein providing the information identifying the plurality of locations associated with the wireless terminal location configuration comprises providing the information identifying one of the plurality of locations based on an aggregation of the plurality of identifications of locations from respective ones of the plurality of configuration reports from the respective wireless terminals.

18. The configuration management system of claim 17 wherein each of the plurality of locations is identified by Global Positioning System (GPS) information associated with the respective location, and wherein the wireless terminal location configuration comprises at least one of a non-transmission mode configuration and/or a silent mode configuration.

* * * * *